United States Patent Office 3,408,878
Patented Nov. 5, 1968

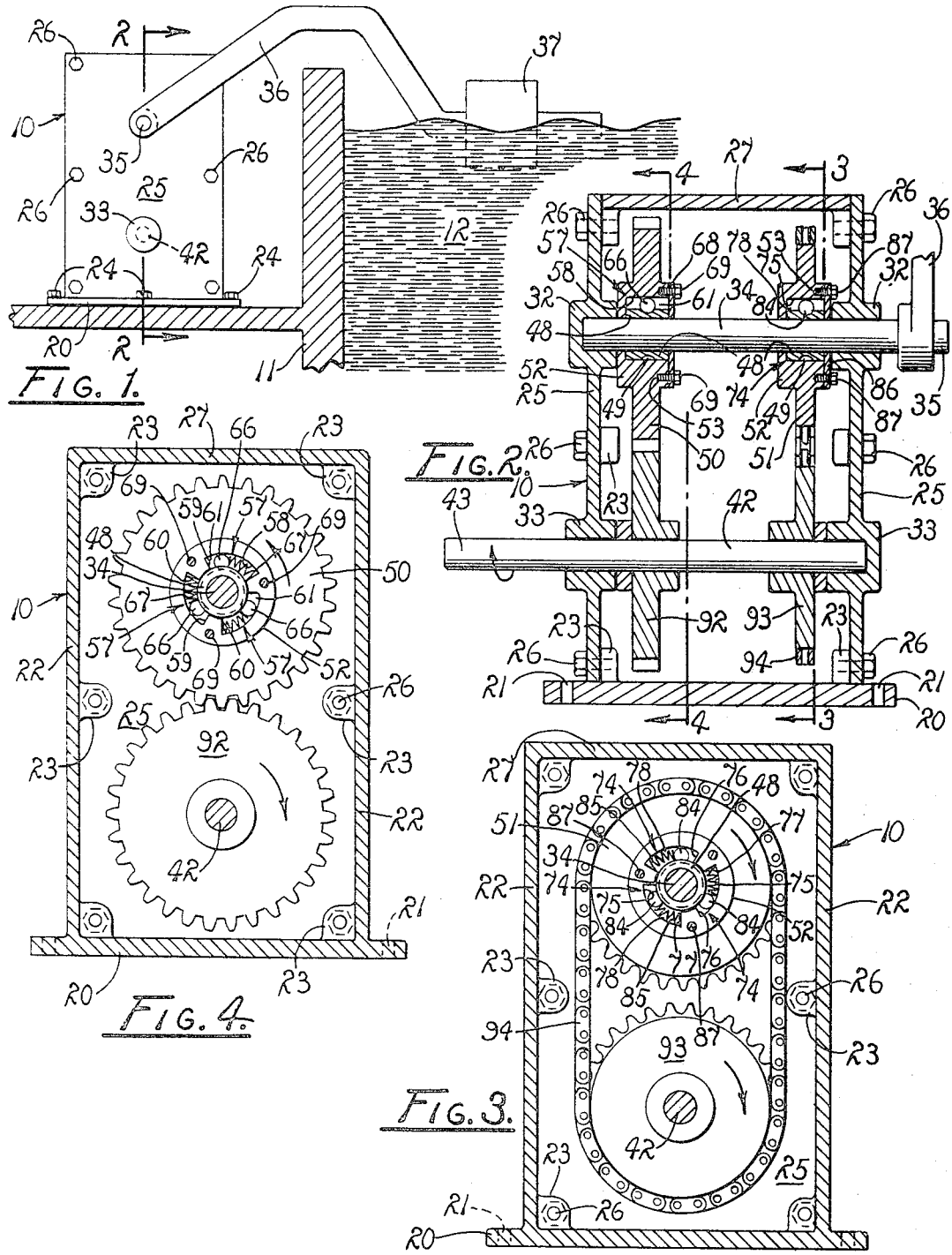

3,408,878
TRANSMISSION
Antonio M. Bertao, 8868 Ave. 280,
Visalia, Calif. 93277
Filed Oct. 18, 1965, Ser. No. 497,087
4 Claims. (Cl. 74—126)

ABSTRACT OF THE DISCLOSURE

A transmission adapted to receive motivating forces of varying magnitude or amplitude, inconsistent direction, periodic or aperiodic frequency, and/or other variable characteristics and to deliver an output motion of continuous direction.

---

The present invention relates to a transmission and more particularly to such a transmission which converts variable motion into motion of continuous direction suited to use as a source of power.

In many situations motion which is a potential source of power goes unharnessed because there is no practical method of converting the motion to a usable form. Thus, the rocking motion of a boat or ship on the ocean and the flexing motion of an automobile's springs, though recognized as potential sources of power, have not prior to the present invention successfully been utilized. The major difficulty has been that the motion in most instances has been in different directions, variable magnitudes and aperiodic rather than rythmical. It has thus not been adaptable to conventional mechanisms.

Certain mechanisms have been devised which are intended to convert variable motion into a usable source of power. However, these devices have been designed for specific uses and have not been successfully adaptable to any operations but those for which they were specifically designed. Moreover, such devices have not been entirely successful in performing their intended operations. They are of rather complex structure employing numbers of gears, bearings, clutches, and belts which require frequent attention. Further, because of their complex structure they dissipate the available power through gear and belt slippage and operative friction.

Accordingly, it is an object of the present invention to provide an improved transmission for converting random or variable motion into a usable source of power.

Another object is to provide such a transmission which is of simple construction.

Another object is to provide a transmission which is adaptable to a wide variety of operations for converting motion in a variety of directions into unidirectional motion, such as rotation in a single direction.

Another object is to provide such a transmission which requires little maintenance.

Another object is to provide a transmission which is of durable construction.

A further object is to provide a transmission which dissipates only a minimum amount of power during operation.

A still further object is to provide a transmission which is inexpensive to construct.

These, together with other objects and advantages, will become more fully apparent upon reference to the following description and accompanying drawing.

In the drawing:

FIG. 1 is a view in side elevation of the device of the present invention adapted to convert wave motion into a usable source of power.

FIG. 2 is a section of the device, taken on line 2—2 of FIG. 1.

FIG. 3 is a section of the device, taken at a position as indicated by line 3—3 of FIG. 2, showing a sprocket, chain drive and sprocket clutch mechanisms.

FIG. 4 is a section of the device, taken at a position as indicated by line 4—4 of FIG. 2, showing a gear drive and gear clutch mechanisms.

Referring in greater particularity to the drawing, a housing is generally indicated at 10 in FIG. 1. In order to illustrate the utility of the device, the housing is shown mounted on a structure 11 representing a boat hull or any structure adjacent to a body of water. A body of water 12 is shown immediately to the right of the structure 11 in FIG. 1.

The housing includes a base 20 having mounting holes 21, and side walls 22 having flanges 23. Bolts 24 are received through the mounting holes of the base and secured to the structure 11 in order securely to mount the housing on the structure, as shown in FIG. 1. The housing also includes shaft support side walls 25 which are mounted on the housing by housing bolts 26 screw-threadably received in the flanges, and top wall 27. Each of the side walls provides an upper input bearing 32 and lower output bearing 33. The bearings of each side wall are vertically aligned and spaced a uniform distance apart. Each of the bearings of one side wall is positioned in horizontal alignment with a corresponding bearing of the opposite side wall. An input or drive shaft 34 is rotatably mounted in the input bearings of the opposite side walls. A drive end 35 of the shaft extends to the right through the bearing to the exterior of the housing, as shown in FIG. 2. A wave arm 36 is mounted on the drive end of the input shaft, as shown in FIG. 1, and outwardly extended therefrom. A float 37 is affixed to the distal end of the wave arm and floats on the body of water 12.

A lower output or driven shaft 42 is rotatably mounted in the output bearings 33. A driven end 43 of the output shaft extends exteriorly to the left of the housing, as shown in FIG. 2. The input and output shafts are positioned in parallel spaced relation, as determined by the positioning of the bearings in which they are mounted.

Two annular collars 48 are mounted in predetermined spaced relation on the input shaft 34. Each of the collars provides a concave groove 49 about its periphery, as shown in dashed lines in FIG. 2. A drive gear 50 is rotatably mounted concentrically about the collar farthest from the drive end 35 of the input shaft. A drive sprocket wheel 51 is rotatably mounted concentrically about the collar nearest the drive end of the input shaft. The drive gear and drive sprocket wheel each provide a clutch housing 52 which encloses its respective annular collar excluding the portion facing the drive end of the input shaft. The clutch housings provide plate mounting bores 53.

The clutch housing 52 of the drive gear 50 has three gear clutch mechanisms 57 in spaced relation about its collar. The clutch mechanisms include gear cam surfaces 58 in the housing which slope in counterclockwise directions toward their collar, as viewed in FIG. 4. The clutch mechanisms also provide short and tall gear end walls 59 and 60, respectively. The cam surfaces, short and tall end walls, and the collar of the clutch mechanisms define gear cam slots 61. Gear ball bearings 66 are movably mounted in the cam slots of the mechanisms between the cam surfaces and the groove 49 of the collar. Gear springs 67 are compressibly mounted between the tall side walls and the ball bearings within the cam slots. A gear closure plate 68 is received about the input shaft and mounted by closure bolts 69, being screw-threadably received in plate mounting holes 53, in closing relation to the portion of the gear clutch housing facing the drive end of the input shaft.

The clutch housing 52 of the drive sprocket wheel 51 also has three sprocket wheel clutch mechanisms 74 in spaced relation about its respective collar 48. Each of the mechanisms is of a construction similar to that of the gear clutch mechanisms 57. The mechanisms of the drive sprocket wheels include sprocket wheel cam surfaces 75 in the housing which slope in a clockwise direction toward their collar, as viewed in FIG. 3, and sprocket wheel short and tall end walls 76 and 77, respectively. The cam surfaces, the short and tall end walls, and the collar of the clutch mechanisms define sprocket wheel cam slots 78. Ball bearings 62 are movably mounted in the cam slots between the cam surfaces and the groove 49 of the collar. Sprocket wheel springs 85 are compressibly mounted between the tall side walls and the ball bearings within the cam slots. A sprocket wheel closure plate 86 is received about the input shaft and mounted by sprocket wheel closure bolts 87, being threadably received in plate mounting holes 52, in closing relation to the portion of the clutch housing facing the drive end of the input shaft.

A driven gear 92 is mounted in fixed relation, as by welding or keying, on the output shaft 42 in driving engagement with the drive gear 50 of the input shaft thus forming a gear train with the drive gear. A driven sprocket wheel 93 is mounted in fixed relation, as by welding or keying, on the output shaft. An endless chain 94 is mounted in driving engagement about the drive sprocket wheel and driven sprocket wheel.

*Operation*

The operation of the described embodiment of the subject invention is believed to be clearly apparent and is briefly summarized at this point. The device of the present invention has a wide variety of applications. One such application is shown in FIG. 1 and is indicative of its utility. The wave action of the body of water 12 imparts an up and down motion to the float 37 and wave arm 36. This motion rotates the input shaft 34 of the device in alternating directions, varied amounts and frequently aperiodically. Of course, insofar as the transmission is concerned, the input shaft may be rotated in a continuous direction. In the present instance, however, when the input shaft is rotated in a counterclockwise direction, as viewed in FIG. 4, the drive gear 50 by means of the clutch mechanisms 57 is locked to the input shaft. This occurs as a result of the collar 48 of the drive gear rotating with the shaft thus wedging the ball bearings 66 of the clutch mechanisms between the groove 49 of the collar and the sloping cam surfaces 58. The gear springs 67 hold the ball bearings in position so that upon the beginning of counterclockwise movement of the drive shaft and collar the drive gear is immediately locked to the collar and shaft.

Simultaneously, as the input shaft is rotated in the described direction, the collar of the drive sprocket wheel 51 urges the sprocket wheel ball bearings 84 against the springs 85 and thus away from locking positions. Thus, the input shaft rotates freely in the sprocket wheel without imparting rotational movement to the sprocket wheel.

The drive gear 50 rotating in a counterclockwise direction rotates the driven gear 92 and hence the output shaft 42 in a clockwise direction, as indicated by the directional arrows of FIG. 4.

When the input shaft 34 is rotated in a clockwise direction, the drive sprocket wheel is locked to the shaft by means of the sprocket wheel clutch mechanisms 74 in the same manner as the drive gear was locked to the input shaft. Simultaneously, the clockwise rotating input shaft unlocks the drive gear allowing the input shaft to rotate freely without rotating the drive gear.

As the drive sprocket wheel 51 rotates in the clockwise direction it rotates the driven sprocket wheel 93 and output shaft 42, by means of the endless chain 94, in the same direction, as indicated by the direction arrows of FIG. 3.

Thus, a device is provided which simply and inexpensively converts motion in variable directions into motion in a single direction. Regardless of which direction the input shaft 34 is rotated, the driven end 43 of the output shaft 42 rotates in a clockwise direction, as viewed in FIGS. 1, 3 and 4 as long as the motion of the input shaft is maintained. The gear springs 67 and sprocket wheel springs 85 maintain their respective ball bearings 66 and 88 adjacent to positions to lock their gear or sprocket wheel to the drive shaft. Thus, locking and unlocking of the clutch mechanisms 57 and 74 incident to a change in direction of the input shaft prevents slipping of the drive shaft within the drive gear and sprocket wheel before one of them becomes locked to the shaft. Such locking and unlocking is virtually instantaneous and dependable.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A transmission comprising a housing, an input shaft rotatably mounted in the housing, an output shaft rotatably mounted in the housing in substantially parallel relation to the input shaft, two sets of drive members interconnecting said shafts for driving rotation of the output shaft in response to rotation of the input shaft, one thereof being adapted to rotate the output shaft in the same direction as the input shaft and the other being adapted to rotate the output shaft in the opposite direction to the input shaft, and clutch means on the input shaft responsive to the direction of rotation of the input shaft actuating one drive member with the opposite drive member released when the input shaft rotates in one direction and actuating said opposite drive member with said one drive member released when the input shaft rotates in the opposite direction.

2. A transmission comprising a housing, an input shaft rotatably mounted in the housing, an output shaft rotatably mounted in the housing in substantially parallel relation to the input shaft, a pair of gears interconnecting said shafts for opposite driving rotation of the output shaft in response to rotation of the input shaft, a sprocket wheel and chain assembly interconnecting said shafts for corresponding rotation of the output shaft in response to rotation of the input shaft, and unidirectional clutch means on the input shaft operable in opposite directions adapted alternately and selectively to actuate the gears and the sprocket wheel and chain assembly in response to the direction of rotation of the input shaft.

3. A transmission comprising a housing; a rotary drive shaft mounted in the housing; a rotary driven shaft mounted in the housing substantially parallel to the drive shaft, a pair of meshing gears, one thereof being mounted rigidly on the driven shaft and the other being mounted for rotation on the drive shaft; a sprocket wheel and chain assembly including a sprocket wheel rigidly mounted on the driven shaft, a sprocket wheel rotatably mounted on the drive shaft, and a chain interconnecting the sprocket wheels in driving relation; a clutch provided between the drive shaft and the rotatable gear interconnecting said gear and shaft in driving engagement when the drive shaft is rotated in a predetermined direction and releasing the gear when the drive shaft is rotated in the opposite direction; and a clutch provided between the rotatable sprocket wheel and the drive shaft interconnecting said sprocket wheel and shaft in driving engagement when the drive shaft is rotated oppositely to said predetermined direction and releasing said sprocket wheel when the drive shaft is rotated in said predetermined direction.

4. A transmission comprising a housing; a rotary drive shaft mounted in the housing; a rotary driven shaft mounted in the housing substantially parallel to the drive shaft; a pair of operatively engaged rotary drive gears, one of which is rotatably mounted on the drive shaft and the other of which is rigidly mounted on the driven shaft; a sprocket wheel and chain assembly having one sprocket wheel rotatably mounted on the drive shaft, another sprocket wheel rigidly mounted on the driven shaft, and a chain in driving engagement about the sprocket wheels; a unidirectional clutch provided in the gear of the drive shaft locking the gear to the shaft when the shaft is rotated in a predetermined direction and releasing the gear when the shaft is rotated in the opposite direction; and a unidirectional clutch provided in the sprocket wheel about the drive shaft locking said sprocket wheel to the shaft when the drive shaft is rotated in a direction opposite to said predetermined direction and releasing the gear when the drive shaft is rotated in said predetermined direction.

References Cited

UNITED STATES PATENTS 2,351,012   6/1944   Carpenter _____ 74—812

FOREIGN PATENTS 932,397   9/1955   Germany.

C. J. HUSAR, *Primary Examiner.*